March 11, 1952     J. PATTNER     2,589,023
GOVERNOR OPERATED STEADYING WHEELS FOR MOTORCYCLES
Filed Dec. 10, 1948     2 SHEETS—SHEET 1

INVENTOR.
JACOB PATTNER
BY
*Zoltan Hrobchek*
ATTORNEY

March 11, 1952   J. PATTNER   2,589,023
GOVERNOR OPERATED STEADYING WHEELS FOR MOTORCYCLES
Filed Dec. 10, 1948   2 SHEETS—SHEET 2
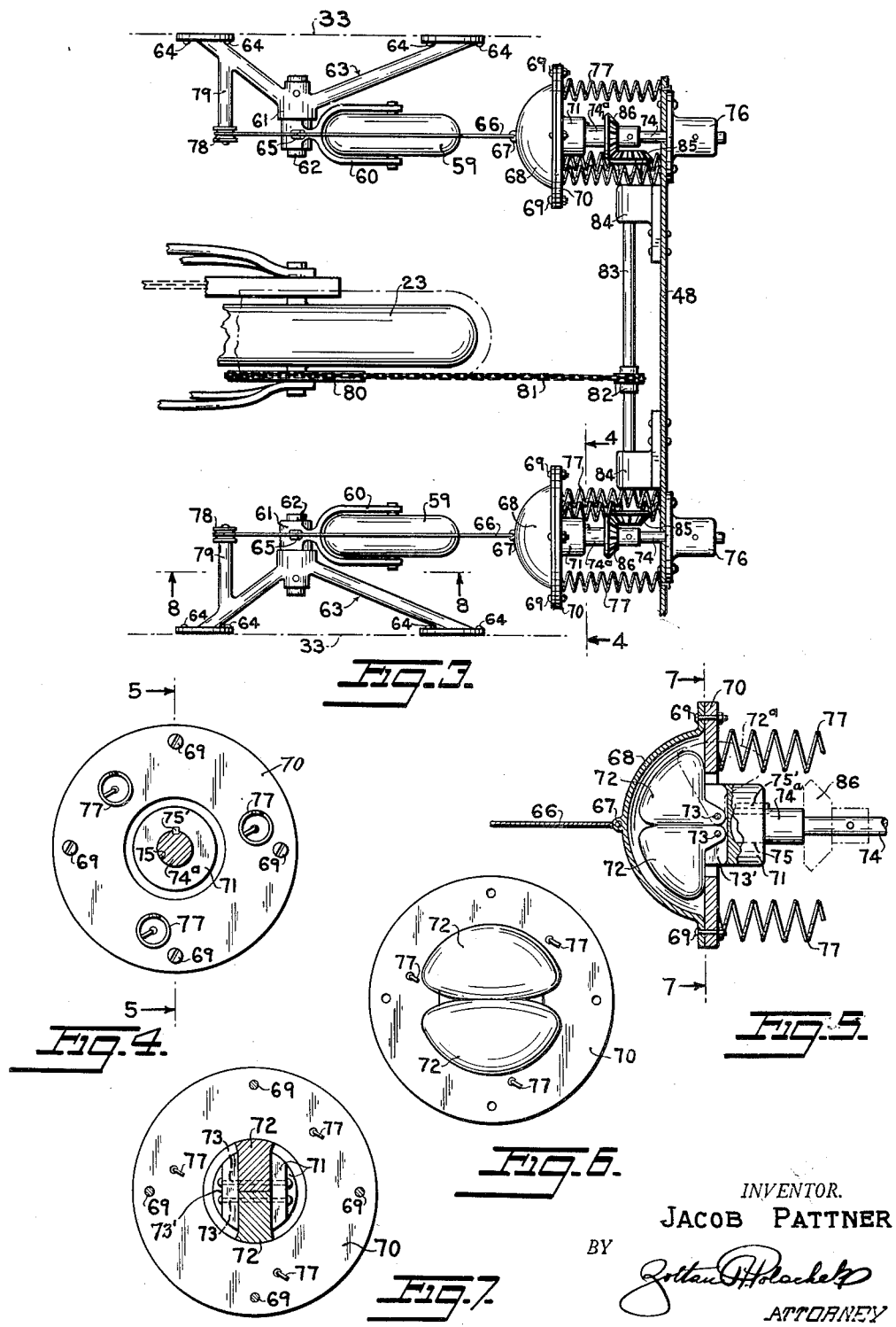
INVENTOR.
JACOB PATTNER Patented Mar. 11, 1952

2,589,023

UNITED STATES PATENT OFFICE 2,589,023

GOVERNOR OPERATED STEADYING WHEELS FOR MOTORCYCLES

Jacob Pattner, New York, N. Y.

Application December 10, 1948, Serial No. 64,499

4 Claims. (Cl. 280—301)

This invention relates to new and useful improvements in automotive vehicles, and, more particularly, the aim is to provide a governor operated means for raising the steadying wheels mounted along the sides of the rear wheel of a motorcycle.

Since a motorcycle has two wheels, arranged tandem fashion, or with one ahead of the other, the motorcycle may be maintained upright by the rider thereon only while the motorcycle is travelling at a sufficient speed under its own power. The present invention proposes the inclusion of a pair of steadying wheels, these preferably of smaller diameter than the wheels of the standard motorcycle, in combination with an improved mounting means for the steadying wheels and an improved means for raising the steadying wheels as required. A preferred feature of the invention in this last regard, is a means for thus raising the steadying wheels which is wholly automatic, that is, which is adapted, when the motorcycle slows down almost to stopping, to lower the steadying wheels, and, as soon as the motorcycle has resumed forward movement, to cause elevation of the steadying wheels.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 4 is a fragmentary vertical section taken on the line 4—4 of Fig. 3.

Fig. 5 is a like section, this taken on the line 5—5 of Fig. 4, and showing a bevel pinion in dot and dash lines.

Fig. 6 is an elevational view, looking toward the right in Fig. 5, but with the dome-cap omitted.

Fig. 7 is a vertical section taken on the line 7—7 of Fig. 5.

Fig. 8 is a framentary vertical section taken on the line 8—8 of Fig. 3, but with here the parts drawn to the same scale as in Figs. 1 and 2; this view showing one of the auxiliary wheels, in full lines, as lowered for road contact, and also showing said wheel, in dot and dash lines, as elevated as in Fig. 1.

Figure 1:
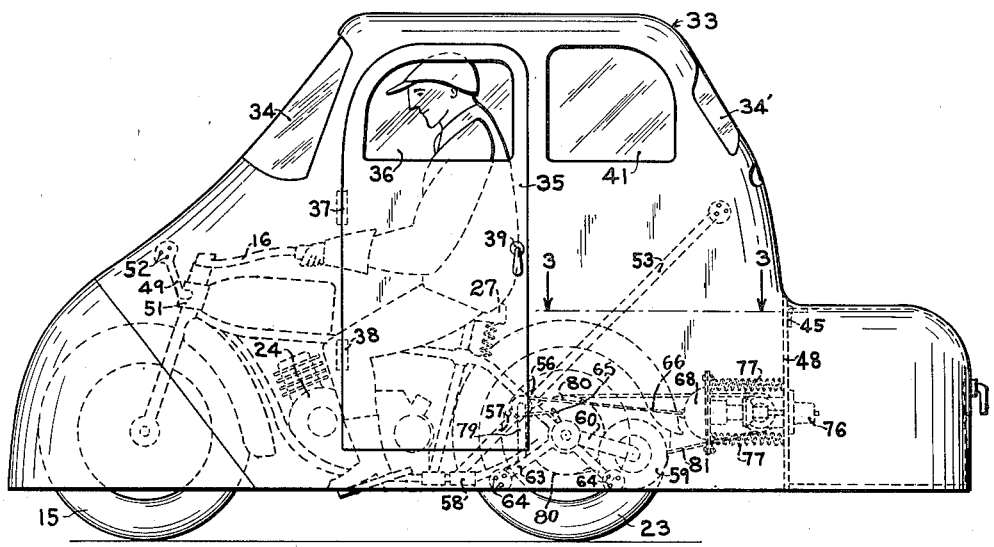
Fig. 1 illustrates an embodiment of the invention as now favored, in side elevation, with a contained motorcycle, a rider thereon, the auxiliary wheels and the means for raising and lowering the latter, all wholly or principally indicated in broken lines.

Referring to the drawings more in detail, the motorcycle illustrated is of conventional construction, incorporating a frame having a front wheel 15 steerable by handle-bars 16 and a rear wheel 23; all as is well understood in the motorcycle art.

A standard type of internal combustion motor is indicated at 24, and the same is suitably mounted, between the wheels 15 and 23, on the frame. Also as is common in motorcycles, the rider's saddle 27 is mounted on the frame.

Figure 2:
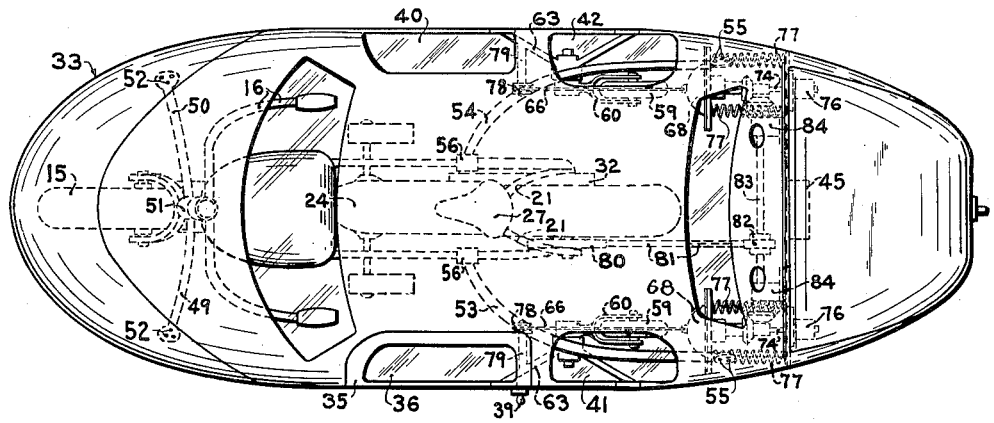
Fig. 2 is a view like Fig. 1, except that here the new vehicle is shown in top plan, with, however, the rider not indicated.

A body 33 is mounted on the motorcycle and is shaped as shown in Figs. 1 and 2 for streamlining and cutting down headwind resistance, may be constructed of any desired material and in any convenient way, and variously interiorly surface-braced in any selected manner. As herein shown, said body has its interior large enough comfortably to accommodate a rider, and also, if desired, a passenger on the usual added rear saddle not shown. Ahead of the rider on the saddle 27 is a forward-vision transparent panel 34; and also shown as present is a rear-vision panel 34'. A side door 35, carrying a transparent window 36, is hingedly mounted as at 37 and 38, and provided with a securing latch 39. Opposite the window 36 is a window 40; and for use by a passenger when the latter is carried are additional side windows 41 and 42.

Mounted across the body 33 rearward of the rear wheel 23, there is a transverse wall 48.

The weight of the entire body 33, which latter may be very light, is sustained by the main frame of the motorcycle; and a convenient and satisfactory means for thus carrying the body 33 is shown in Figs. 1 and 2. This means includes a forward structure comprising a pair of like upwardly and slightly forwardly diverging straight strut elements 49 and 50 extended at their lower ends from the frame of the motorcycle. Each of the strut elements at its upper end is formed to present a circular plate-like portion for fitting flat against the inside contour of the body 33 where such plate is to be placed; said plates being apertured for the application of bolts, rivets or the like 52. The motorcycle-frame-carried supporting means for the body 33 also includes a pair of like upwardly extended, downwardly concavely longitudinally curved and rearwardly diverging strut elements 53 and 54. The strut 53 at its upper end is formed to present a circular plate-like portion for fitting flat against the interior contour of the body 33 where such plate is to be placed; and said plate is apertured for the application of bolts, rivets or the like 55. About three-quarters of the way down the length of the strut 53, it is enlarged by the inclusion of a split collar 56 secured to one part of the motorcycle frame. Below the collar 56 the strut 53 is downwardly continued as indicated at 57 in Fig. 1, and said strut at its bottom has another collar 58 like the collar 56, this collar 58 being secured to another part of the motorcycle frame. As will be observed, the strut 54 is a reversed duplicate of the strut 53. Further constructional details of the motorcycle and the body 33 will not be given in this description as they form no part of the present invention.

Referring now particularly to Figs. 3-8, the two steadying wheels, designated 59, 59, desirably carry inflatable tires as shown. Each such wheel is mounted in a fork 60 integral with a collar 61, arranged for rotation about and suitably retained on a stub-shaft 62 fixedly carried by the hub portion of a hanger 63 suitably secured to the body 33 at the outer ends of the two diverging legs of said hanger by bolts or the like as indicated at 64. At and adjacent to the locations of the securing means 64, as will be understood, the body 33 is suitably reinforced.

Fixedly offset from each collar 61 is a short arm 65, and each such arm has connected thereto the forward end of a pull cable 66 the rear end of which is anchored to an eye 67 formed at the apex of a hollow hemispherical dome-cap 68. Said cap 68, at spaced points around its basal annular flange, is secured by bolts 69 to an annular plate 70. Partially extended into the cap 68 is a centrifugal governor incorporating a cylindrical block 71 and a pair of weights 72 each pivotally mounted on said block as at 73. Said block is flatted as at 73' at opposite sides near its forward end, to facilitate as illustrated the pivotal mounting of the weights 72. Block 71 at its rear portion has a cylindrical recess coaxial therewith and with the hemisphere defined by the dome-cap 68, and the enlarged forward end portion 74ª of a short shaft 74 is fitted into said recess, the latter marked 75.

Figure 3:
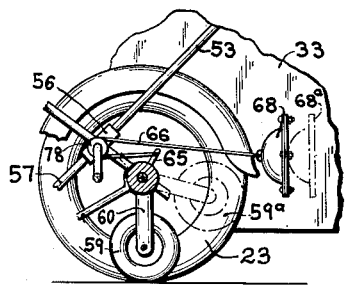
Fig. 3 is an enlarged detail view, this being a horizontal section taken substantially on the line 3—3 of Fig. 1.

Each shaft 74 is keyed as at 75' to the associated block 71, whereby when such a shaft 74 is rotated the block will rotate therewith. Each shaft 74, after passing through a suitable opening in the transverse wall 48, as shown in Fig. 3, is journalled for high speed rotation in an extended bearing provided in a bracket 76 secured as indicated to the said wall 48 at its rear side.

Arranged between each plate 70 and the wall 48 are three fairly heavy expansible coil springs 77, spaced apart 120° around said plate. By means of these springs, and with the vehicle halted or slowed down for stoppage, the parts above described are held as shown in Figs. 1-3 and 5, with the result that each cable 66, such cable passing intermediate its ends over a pulley 78, is allowed sufficient slack to free the steadying wheels for immediate drop, by their own weight or by the aid of suitable booster downthrust springs not shown, to the positions indicated in full lines in Fig. 8, in which view one of said wheels is shown, in dot and dash lines, at 59ª, in its elevated or off the road position shown in Fig. 1. Each pulley 78, it will be noted, is shown as rotatively mounted on the upper end of an arm 79 upwardly inclined and extended laterally of the vehicle and branched off from the forward leg of the hanger 63 at that side of the vehicle.

Each shaft 74 is rotated at high speed, during even fairly slow rotation of the wheel 23 of the motorcycle, by means here shown as including a large sprocket 80 added to the motorcycle and fixed relative to said wheel 23 for rotation therewith. This sprocket is connected by a chain 81 to a small sprocket 82 fixed on a cross shaft 83 journalled in bearings 84, 84 secured to the wall 48 at the forward side of the latter. Fast on said shaft 83, at each end thereof, is a bevel gear 85 meshing with a pinion 86 fast on the short shaft 74 at that side of the vehicle.

Thus each block 71 carrying the weights 72 is whirled at very high speed on sufficient rotation of the wheels of the motorcycle to allow easy maintenance of the balance thereof. Then centrifugal action on the weights causes them to move to positions corresponding to that indicated at 72ª in Fig. 5. The result is that each plate 70 is forced backward an equivalent distance, and, now referring to Fig. 8, both dome-caps 68 are retracted to the positions indicated in dot and dash lines at 68ª, and consequently each cable 66 exerts a pull to raise the auxiliary wheels 59 to the dispositions indicated in Fig. 1 and in dot and dash lines at 59ª in Fig. 8. If necessary, suitable means can be interposed between the weights 72 and the plate 70 to reduce the frictional contact between those parts without interfering with the operation of the device.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. Governor operated means for raising steadying wheels carried by forks pivotally mounted on stub-shafts located on opposite sides of the driven rear wheel of a motorcycle, comprising a transverse shaft rotatively supported across the rear end of the motorcycle, short shafts rotatively supported and extended forward at the ends of said transverse shaft, means connecting said transverse shaft and said short shafts so that said short shafts will be rotated when said transverse shaft is rotated, drive means connecting said transverse shaft and the driven rear wheel of the motorcycle to cause said transverse shaft to be rotated by that driven rear wheel, a pair of opposed weights pivotally mounted on the front end of each of said short shafts to swing outward and rearward as said short shafts are rotated, a hollow casing enclosing each pair of opposed weights, said hollow casings being slidably supported on said short shafts and each having a flat rear plate against which the respective pair of weights press when pivoted outward and rearward to move the respective casing rearward, and means interconnecting said casings and said forks to pivot said fork to raise the steadying wheels carried thereby when the casings are moved rearward.

2. Governor operated means for raising steadying wheels carried by forks pivotally mounted on stub-shafts located on opposite sides of the driven rear wheel of a motorcycle, comprising a transverse shaft rotatively supported across the rear end of the motorcycle, short shafts rotatively supported and extended forward at the ends of said transverse shaft, means connecting said transverse shaft and said short shafts so that said short shafts will be rotated when said transverse shaft is rotated, drive means connecting said transverse shaft and the driven rear wheel of the motorcycle to cause said transverse shaft to be rotated by that driven rear wheel, a pair of opposed weights pivotally mounted on the front end of each of said short shafts to swing outward and rearward as said short shafts are rotated, a hollow casing enclosing each pair of opposed weights, said hollow casings being slidably supported on said short shafts and each having a flat rear plate against which the respective pair of weights press when pivoted outward and rearward to move the respective casing rearward, and means interconnecting said casing and said forks to pivot said forks to raise the steadying wheels carried thereby when the casings are moved rearward, said interconnecting means comprising cables extended between said casings and said forks.

3. Governor operated means for raising steadying wheels carried by forks pivotally mounted on stub-shafts located on opposite sides of the driven rear wheel of a motorcycle, comprising a transverse shaft rotatively supported across the rear end of the motorcycle, short shafts rotatively supported and extended forward at the ends of said transverse shaft, means connecting said transverse shaft and said short shafts so that said short shafts will be rotated when said transverse shaft is rotated, drive means connecting said transverse shaft and the driven rear wheel of the motorcycle to cause said transverse shaft to be rotated by that driven rear wheel, a pair of opposed weights pivotally mounted on the front end of each of said short shafts to swing outward and rearward as said short shafts are rotated, a hollow casing enclosing each pair of opposed weights, said hollow casings being slidably supported on said short shafts and each having a flat rear plate against which the respective pair of weights press when pivoted outward and rearward to move the respective casing rearward, means interconnecting said casing and said forks to pivot said forks to raise the steadying wheels carried thereby when the casings are moved rearward, and resilient means urging said casings forward maintaining said rear plates in facial contact with said weights.

4. Governor operated means for raising steadying wheels carried by forks pivotally mounted on stub-shafts located on opposite sides of the driven rear wheel of a motorcycle, comprising a transverse shaft rotatively supported across the rear end of the motorcycle, short shafts rotatively supported and extended forward at the ends of said transverse shaft, means connecting said transverse shaft and said short shafts so that said short shafts will be rotated when said transverse shaft is rotated, drive means connecting said transverse shaft and the driven rear wheel of the motorcycle to cause said transverse shaft to be rotated by that driven rear wheel, a pair of opposed weights pivotally mounted on the front end of each of said short shafts to swing outward and rearward as said short shafts are rotated, a hollow casing enclosing each pair of opposed weights, said hollow casings being slidably supported on said short shafts and each having a flat rear plate against which the respective pair of weights press when pivoted outward and rearward to move the respective casing rearward, means interconnecting said casing and said forks to pivot said forks to raise the steadying wheels carried thereby when the casings are moved rearward, and coil springs operating between a fixed part of the motorcycle and said rear plates urging said casings forward maintaining said rear plates in facial contact with said weights.

JACOB PATTNER.

REFERENCES CITED

The following references are of record in the file of this patent:

UNITED STATES PATENTS

| Number | Name | Date |
|---|---|---|
| 1,183,938 | White | May 23, 1916 |
| 1,300,772 | Purdy | Apr. 15, 1919 |
| 1,313,175 | Englesson | Aug. 12, 1919 |
| 1,608,512 | Kent | Nov. 30, 1926 |
| 1,725,783 | DeFlorez | Aug. 27, 1929 |

FOREIGN PATENTS

| Number | Country | Date |
|---|---|---|
| 180,239 | Switzerland | Dec. 16, 1935 |
| 332,839 | Great Britain | July 31, 1930 |
| 440,336 | Great Britain | Dec. 16, 1935 |
| 494,013 | Great Britain | Oct. 19, 1938 |